United States Patent [19]
Smith et al.

[11] 3,892,278
[45] July 1, 1975

[54] ROTARY TILLER-MULCHER

[75] Inventors: Alexander Smith; Burton D. Baggs, Jr., both of Sanford, Fla.

[73] Assignee: Smitty's Incorporated, Sanford, Fla.

[22] Filed: Dec. 27, 1972

[21] Appl. No.: 319,039

[52] U.S. Cl. .................. 172/70; 172/112; 172/119; 172/508
[51] Int. Cl. ............................................ A01b 33/00
[58] Field of Search ............ 172/70, 112, 119, 122, 172/123, 61, 68, 148, 150, 540, 553, 32, 67, 72, 511, 512, 611, 553

[56] References Cited
UNITED STATES PATENTS

| | | | |
|---|---|---|---|
| 2,195,899 | 4/1940 | Oetting | 172/553 |
| 3,220,486 | 11/1965 | Smith et al. | 172/119 |
| 3,557,879 | 1/1971 | Van Der Lely et al. | 172/32 |

FOREIGN PATENTS OR APPLICATIONS

| | | | |
|---|---|---|---|
| 1,233,316 | 10/1960 | France | 172/119 |

Primary Examiner—Stephen C. Pellegrino
Attorney, Agent, or Firm—Julian C. Renfro, Esq

[57] ABSTRACT

An improved rotary tiller capable of performing effective mulching, even when the field in which our device is to be operated has previously yielded a crop of corn or cane. Not only is our novel device effective when corn or cane stalks or other heavy vegetation, including tree roots or palmettos are to be mulched, but also, it is capable of performing a leveling function, such that only with difficulty can the crop previously grown be recognized from a cursory examination of the surface of the field. The blade means we use are so effective in cutting up vegetation that it is rarely necessary to operate our device across a field in a second direction orthogonal to a first direction.

20 Claims, 15 Drawing Figures

ROTARY TILLER-MULCHER

RELATIONSHIP TO PREVIOUS INVENTIONS

This invention is generally relatable to those cultivator inventions represented by certain of our previous U.S. Patents, such as Pat. Nos. 3,181,619 and 3,220,486.

BACKGROUND OF THE INVENTION

The need for comparatively shallow tillage of land has led to numerous configurations of tillers, but virtually all tillage prior to the present invention has been accomplished by modern forms of old tools, such as the turn-plow and the harrow. However, even modern devices of such character were rarely effective when heavy vegetation was involved, and it was usually necessary to pass such prior art devices through a field a number of times, including using it in cross or orthogonal directions in order to achieve even marginal results.

SUMMARY OF THIS INVENTION

The present invention involves a vastly improved form of rotary tiller, in that it will perform a highly effective mulching function, even when heavy vegetation is involved, thus minimizing the number of times it must be moved through a field in order to render that field suitable for planting.

That this may be accomplished, we utilize a wheeled housing in which a bladed rotor is driven in the rotative direction opposite to that of the supporting wheels or roller means, with the blades of such rotor cooperating with a shear bar mounted on the interior of such housing, to cut up all forms of vegetation, clods, and the like, and render the earth of a desirable consistency.

In accordance with our invention, the blades of our counter-rotating rotor are effective to deliver a considerable amount of power into the earth and vegetation encountered, cutting the vegetation into small pieces, and mixing it and the earth into an almost fluid mixture, hereinafter referred to as a fluidized mixture. This mixture exists in front of the rotor in what is termed a preceding roll, with the action of the rotor being effective to cause the flow of the fluidized mixture of earth and vegetation over the rotor on an almost continuous basis. The preceding roll is available for filling holes and furrows encountered as our device passes through a field, thus enabling our device to perform a very effective leveling function.

It is a primary object of our device to provide a rotary tiller capable of performing a highly effective mulching function, even when encountering heavy vegetation.

It is another object of our invention to provide a rotary tiller capable of performing a mulching function contemporaneously with a leveling function.

It is yet another object of our invention to provide a rotary tiller capable of working soils of various compositions, such as sand, clay, loam and gumbo, with widely varying water contents.

It is still another object of our invention to provide a rotary tiller that can be operated for a minimum number of passes through a field, yet capable of leaving the field level as well as in condition for immediate planting.

It is yet still another object of our invention to provide a rotary tiller that will thoroughly mix with the soil, any vegetation and chemicals in its path.

These and other objects, features and advantages will be more apparent from a study of the appended drawings in which.

DETAILED DESCRIPTION

Figure 1:
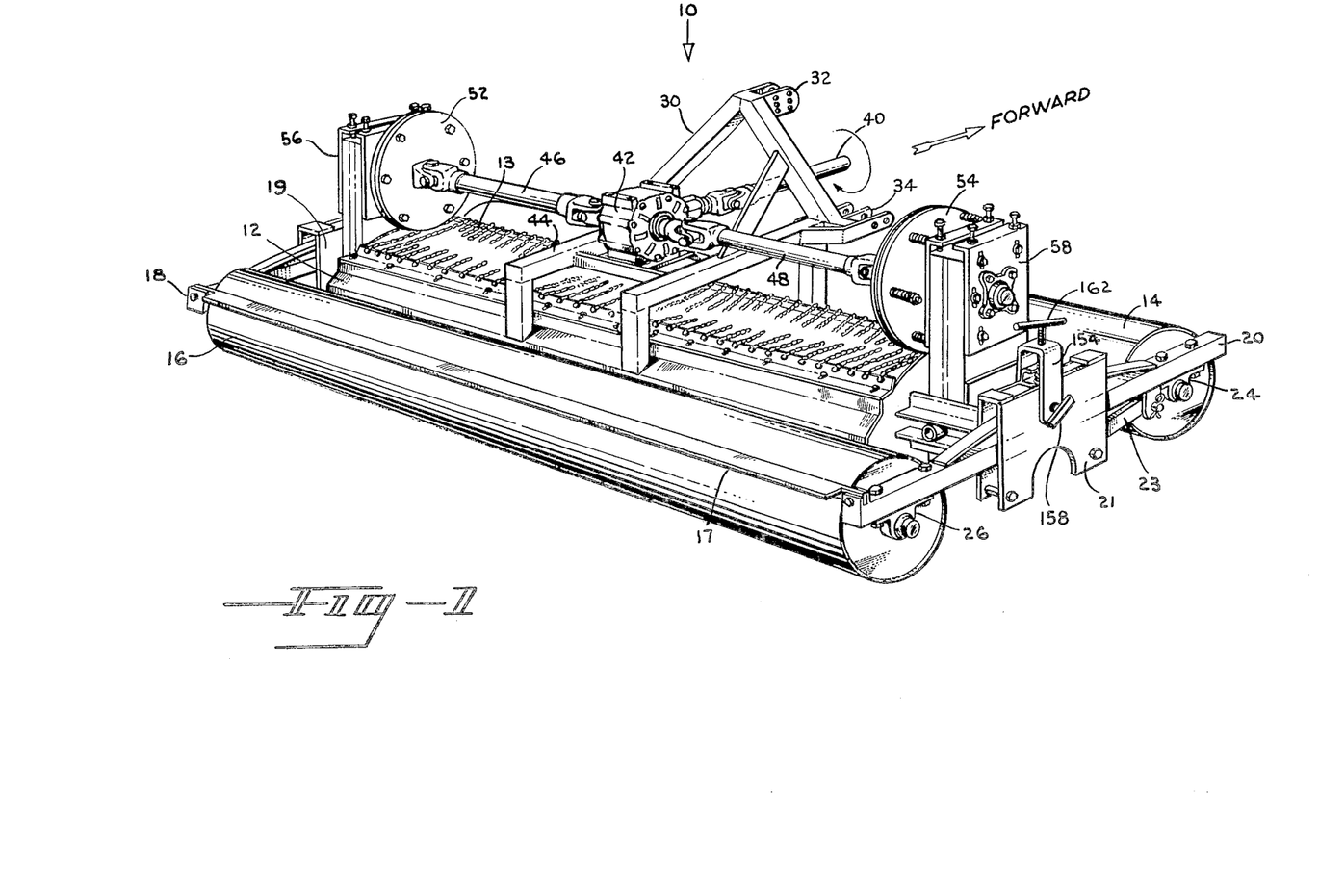
FIG. 1 is a perspective view of a rotary tiller-mulcher in accordance with our invention, which is adapted to be drawn by a tractor or other powered vehicle.

Turning to FIG. 1, it will there be seen that we have illustrated a mulching type tiller 10 of the type to be drawn through a field or farm by a tractor or other appropriate vehicle (not shown). A housing 12 serves as a cover for our novel tiller rotor described at length hereinafter, with the housing being supported by a forward roller 14 and a rear roller 16. The rollers are maintained in the spaced relationship shown in FIG. 1 as well as in FIGS. 2 through 4 as the tiller moves over the ground by virtue of the fact that we use cross axles 18 and 20 at essentially opposite ends of the housing, with suitable bearings 24 and 26 being provided on the underside of the cross axles, in which are received the stub shaft located at each end of each roller. Although the rollers 14 and 16 support the weight of the housing and the components carried thereby, the rollers are in a type of floating relationship with respect to the housing so as to take into consideration uneven ground situations, this being made possible by virtue of the fact that the cross axles 18 and 20 are movable to a limited degree in adapted plates 19 and 21, respectively.

Figure 3:
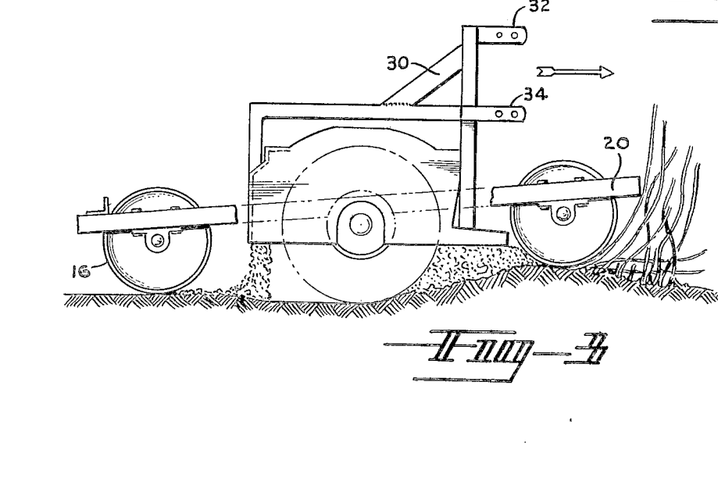
FIGS. 3 and 4 are related views illustrating how the supporting rollers can tilt with respect to the housing for the rotor when our device is passing over uneven ground, with this tilting not adversely affecting the tilling and mulching action of our novel device.
Figure 4:
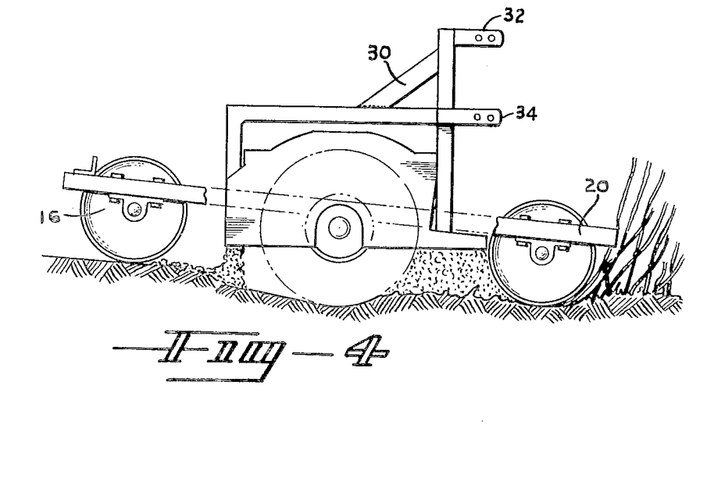

The tractor or other vehicle utilized for pulling our mulching type tiller through a field or the like is attached by means of a three point hitch arrangement 30, as is to be seen in FIG. 1 as well as in FIGS. 3 and 4. As perhaps best seen in FIg. 1, this hitch has an upper connection point 32 as well as a pair of lower connection points 34, with the points 34 being spaced approximately as far apart as they each are spaced from upper point 32. As a result of this more or less conventional hitch arrangement, the housing 12 maintains approximate verticality at all times, although if the pulling vehicle starts up a grade or down a grade, the housing will move away from the vertical to some extent.

FIGS. 3 and 4, as mentioned above, illustrate the relationships as the rollers 14 and 16 move over an irregularity or change of grade or elevation, and it is to be noted that the housing 12 does no move appreciably away from the essentially vertical position shown in each figure on such occasions. The arrangement making this possible will be discussed in detail hereinafter.

As is apparent from FIG. 1, a rotary shaft 40 is arranged to be driven in rotation from the power take-off of the tractor, and a gearbox 42, supported above a central portion of the housing 12 by a framework 44, is arranged to receive the power supplied by the shaft 40, and then redirect it along the lateral shafts 46 and 48. It will be noted that a universal joint is provided adjacent the input and output locations of the gearbox to allow for relative movement. The outboard end of shaft 46 is connected through a universal joint to a friction type torque limiter 52, and the outboard end of shaft 48 is connected through a universal joint to a friction type torque limiter 54. Power transmitted through these torque limiters is utilized for turning drive chains disposed in chain housings 56 and 58, which chains are responsible for causing the tiller rotor to rotate. The preferred direction of rotation for the tiller is counter to the direction of travel of the housing over the ground; note FIG. 2. The reason for this will be later elaborated, but it should be mentioned that the interior of housing or cover is configured in a manner appropriate for the rotation therein of the tiller rotor, with there being an opening or gap along the uppermost portion of the housing, closed by a parallel array of chains 13; see FIGS. 1 and 2.

Figures 5, 5A, 5B, 6:
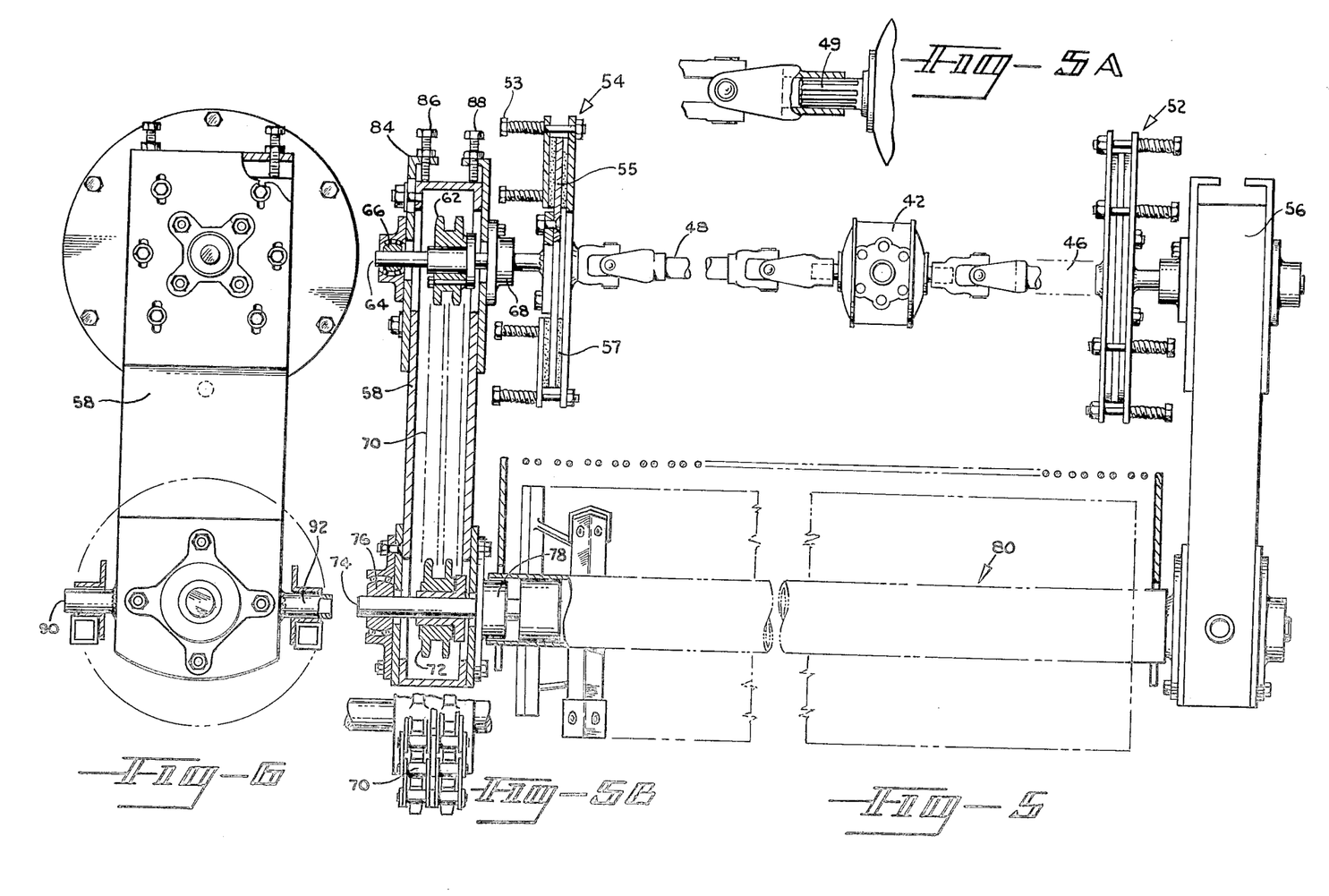
FIG. 5 is a cross sectional view that has been somewhat foreshortened in order to reveal the manner in which power is delivered to our novel rotor through a pair of chain housings.
FIG. 5A is a fragmentary view revealing the use of a splined joint at one or more locations in our drive train.
FIG. 5B is a fragmentary view revealing the type of double chain we use in each chain housing.
FIG. 6 is a view of the chain housing taken from a direction 90° to the direction of this component in FIG. 5.

Turning now to FIG. 5, it will be seen how power supplied to the gearbox 42 from the power take-off of the tractor is carried outwardly by the shafts 46 and 48, through the torque limiters 52 and 54, and thence to upper chain sprockets located in essentially identical chain housings 56 and 58. These torque limiters are each adjusted to transmit one-half of the available power. Chain housing 58 has been herein sectionalized to reveal upper sprocket 62 that of course receives a considerable amount of power from the tractor. This sprocket is mounted on a shaft 64 that is supported by an outer bearing 66, preferably a ball bearing, and an inner bearing 68, also preferably a ball bearing. Chain 70, preferably a double chain, is operatively disposed over the sprocket 62, with the lower portion of this chain extending around lower sprocket 72. The lower sprocket is operatively mounted upon shaft 74 of rotor 80, with the outer end of shaft 74 being supported in a ball bearing 76, and the inner end of shaft 74 being supported in a double tapered self aligning roller bearing 78. The reason for the double bearing arrangement being utilized with the shafts 64 and 74 is that the chain 70 is arranged to transmit a considerable amount of power to the contra rotating tiller rotor 80 shown in this figure, and if a double bearing arrangement were not used, the shafts would tend to bend, undergo considerable flexure, and then break in an untimely manner.

If the power take-off from the tractor is arranged to supply power at 540 rpm, we prefer to use a 2.55 to 1 gearbox 42, with the input sprocket 62 having 16 teeth and the output sprocket 72 having 14 teeth, whereas if the tractor is to supply power at 1000 rpm, we prefer to use a 3.11 to 1 gearbox, with the input sprocket having 14 teeth and the output sprocket having 16 teeth. These arrangements are utilized so that the rotor 80 can be operated in the preferred speed range of 240 to 280 rpm, when the rotor diameter is 18 inches.

Because each chain, such as chain 70 shown in FIG. 5 (and FIG. 5B) tends to elongate in use, we preferably utilize a chain tightening arrangement such that we can from time to time raise the member 84 upon which the bearing supports for bearings 66 and 68 are mounted. Bolts 86 and 88 are threadedly disposed in the upper portion of member 84, with the lower ends of these bolts bearing against the upper portion of the chain housing 58. Upon bolt 86 and 88 being tightened, they tend to force the member 84 upward, lifting the bearings 66 and 68, with this in turn causing the shaft 64 to be raised with respect to the lower shaft 74, and this having the effect of tightening the chain. Appropriate slots in members 58 and 84 permit the motion just described.

Despite the double bearing arrangement utilized in conjunction with each of the shafts 64 and 74, it is always possible that some eccentricity may arise in the shafts. For example, when a large amount of power is being applied to the tiller rotor 80, the rotor may bow a bit, this having the result of causing some deflection in the shaft 74. To prevent this from causing the shaft to bend and ultimately break, we preferably arrange for the chain housings 56 and 58 to "float", or in other words, move to conform to the deflections of the shaft 74. That this can take place, we mount the chain housings in the manner shown in FIG. 6 with regard to chain housing 58, that is, supported by stub shats 90 and 92. This is to say, the chain housings are not rigidly bolted to the housing 12, but rather the upper portions are free to move, to a limited extent at least, about the shafts 90 and 92 and with respect to the housing, and thus conform to the possible deflections of the shaft 74. Because of some motion of the upper portion of the chain housings, we preferably utilize spline type joints on each side of the gearbox 42; note joint 49 in FIG. 5A.

It should be mentioned that the torque limiters 52 and 54 serve to enable an inequality in the tightness of the drive chains to be quickly resolved, for a controlled amount of slippage can take place in either of these devices from time to time as required. With regard to FIG. 5, the outer housing portion of the torque limiter 54 is driven in rotation by shaft 48, with clutch facings 57 therein contacting firmly the driven plate or disk 55 that is attached to the shaft 64. A series of bolts 53 spaced about the periphery of the outer housing enable respective springs to be tightened so as to control the force with which the friction facings 57 grip the plate or disk 55, and thus establish how much torque will be transmitted before slippage occurs.

The torque limiters are additionally important in that they serve to prevent damage should the tiller rotor suddenly become jammed or locked, such as may occur if it encounters a buried piece of scrap iron or the like. In such an instance, both torque limiters slip. Also if a component such as a drive chain fails, the torque limiter on the other side of the machine functions to prevent damage by not transmitting the full torque to the one-piece rotor 80.

Figures 7, 7A, 7B:
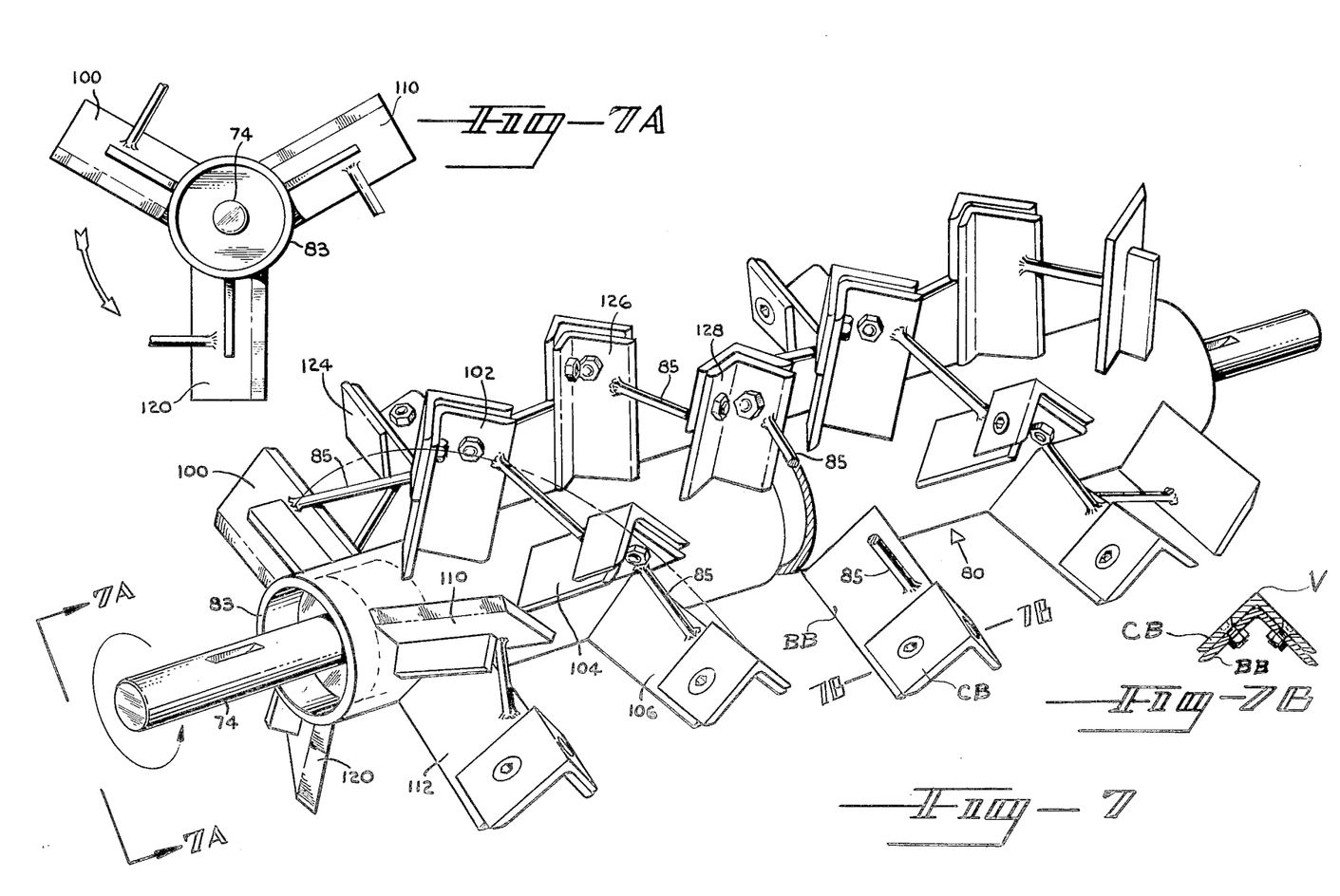
FIG. 7 is a perspective view of our novel bladed rotor utilizing three separate but interlaced helical blade arrays.
FIG. 7A reveals the appearance of one end of the rotor of FIG. 7.
FIG. 7B is a fragmentary view revealing the cross sectional appearance of the blade means used on our rotor.

Turning now to FIG. 7, it is to be seen that the tiller rotor 80 is equipped with numerous blade holders or blade bases of steel that are welded in spaced relation about the periphery of the drum-like member 83, with a cutter blade secured to each blade base. FIGS. 7 and 7B show a typical blade base BB of the tiller rotor, to which the cutter blade CB is preferably secured by the use of a pair of flathead bolts, which bolts thread into nuts placed on the rear side of the blade bases. The cutter blades are of wear resistant material, usually of alloy steel, for the cutter blades are arranged to directly contact the earth to cut and shred vegetation, mulch, break up clods, and in general to till the soil. When a substantial amount of wear has taken place, because the cutting blades are symmetrical, they may be turned over and bolted again in the new position, so as to be usable for an additional period of time before needing to be replaced.

Figure 2:
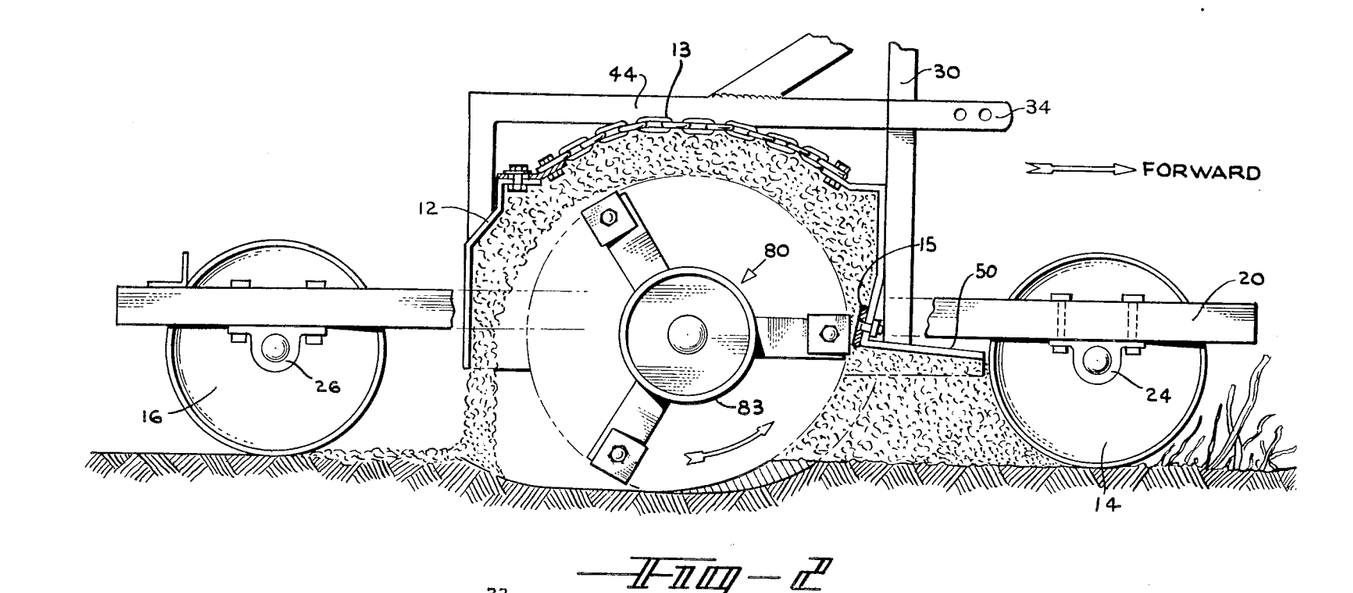
FIG. 2 is a side elevational view to a large scale that has been partially sectionalized to reveal the operation of our novel counter-rotating bladed rotor, with this figure also revealing the preceding roll that is created in front of the rotor.

In most instances, we utilize a shear bar 15, as shown in FIG. 2, in conjunction with the cutter blades so that shredding and mulching rather than mere tilling can take place. The shear bar is of steel, bolted to the inside of housing 12 adjacent the capture plate 50, and is preferably one-half inch thick and 2 inches high. So that the shear bar can be effective, we construct the cutter blade bases and cutter blades to a carefully controlled size, so that we can normally maintain say ⅛ inch clearance between the outermost portions of the cutter blades and the shear bar 15. An adjustment bolt (not shown) on each side of the rear of the housing threads into the respective rear stub shaft 90 of each chain box with adjustment of such bolts controlling the fore-and-aft position of the rotor axis with respect to the shear bar.

When for example corn stalks or cane are being mulched, a somewhat wider clearance can be utilized between the shear bar and the rotating blades, whereas when finer materials are to be shredded, a minimum amount of clearance is desirable. If no shredding is desired, but chemicals such as herbicides or fertilizer are to be mixed with the soil, maximum clearance is utilized, or even removal of the shear bar may be desirable, thus diminishing the power required, and enabling the tractor to maintain a higher ground speed, or even enabling a smaller size tractor to be utilized.

With continued reference to FIG. 7, we have found it preferable to dispose the blades in a helical arrangement, so that hard objects such as rocks will be kicked out to one side of the device. More specifically, we prefer to weld the blade holders or blade bases in a three helix arrangement, using a 32 inch pitch, and employing eight blades for each 360° of each helix. Steel bars 85 secure together each adjacent blade holder of each helix, with these not only giving considerable strength to the arrangement, but perhaps even more importantly, these bars 85 prevent sticks, roots and rocks from becoming jammed between the blade holders.

FIG. 7A illustrates the 120 blade degree spacing to be found at almost every selected location along the axis of the tiller rotor, with each blade at each axial location selected of course belonging to a different helix. For example, blade holder 100 (actually a half blade) appearing in FIGS. 7 and 7A is connected by a bar 85 to the next blade holder of the involved helix, which is blade holder 102 in this instance. Latter blade holder is in turn connected by a bar 85 to the next blade holder of that helix, which FIG. 7 reveals to be blade holder 104. Blade holder 104 is in turn connected by a bar 85 to blade holder 106, and so forth along the tiller rotor.

Similarly, blade holder 110 is connected by a bar 85 to blade holder 112, with latter blade in turn being connected to further blade holders of this second helix, with such blade holders not being immediately identifiable in FIG. 7. Blade holder 120 is representative of the third helix of the tiller rotor, with this blade holder being connected by a bar 85 to the next blade holder of this series, with that blade holder in turn being connected to blade holder 124 shown in FIG. 7. Blade holder 124 is connected by a bar 85 to blade holder 126, and blade holder 126 is connected to blade holder 128 and so forth.

As should now be apparent, we have in this manner created a very sturdy and effective tiller rotor with three interlaced but separate helices running along the length of the rotor, with the arrangement being such that our device is highly effective in mulching, shredding, and in working soils of various compositions such as sand, clay, loam and gumbo, with widely varying water contents.

It should be pointed out that successive blades are preferably spaced axially to sweep contiguous or slightly overlapped paths, with the angular spacing being such that the faces of the blade holder parallel to the bars 85 will conform to a helix having a radius from the rotor axis preferably just short of the cutter blades or wear pieces. Note the curved dashed line in FIG. 7. Small departures from this preferred radius are tolerable, but are generally disadvantageous. In one practical device, the blade radius is nearly 9 inches and the helix radius 7 inches.

With regard to blade construction, we prefer the working faces of any cutter blade to be equally and oppositely inclined to a plane containing their vertex V and orthogonal to the rotor axis. Preferably the blade faces are disposed 90° apart, making commercially-available materials suitable for utilization in connection with the blade bases, and even the cutter blades CB.

Tiller rotor 80 is revealed in FIG. 7 to be turning in the preferred direction, which is in the contra direction indicated by the arrow depicted in this figure. This arrangement of course means that the vertex of each blade first intercepts the soil, in the general manner shown in FIG. 2, with the symmetrical side portions of the blades causing the intercepted earth to be thrown to each side essentially symmetrically.

As further discussed below, the preferred range of blade angles will result in the turning of a relatively long strip of soil by each blade face, which will be thrown forward and to the side, to be cut by passage of succeeding blades until it enters the preceding roll of soil contained under the capture plate 50 of FIG. 2. The repeated sideways components of motion result in thorough cross-mixing of the soil with vegetation and added chemical and reduce clods to small size. The preceding roller 14 addiionally holds tall vegetation while it is cut into suitable lengths by the blades and in combination with the capture plate 50 prevents vegetation from floating out of the preceding roll of soil, which would produce a secondary roll which would severely reduce the work accomplished.

The cross-mixing takes place across the whole length of the tiller rotor, except of course in the instance of the half blades 100, 110 and 120 at the left end of the tiller rotor shown in FIG. 7, and the half blades shown at the opposite ends of the tiller rotor. Half blades of the type illustrated in this instance play a significant role in directing the intercepted earth inwardly, rather than earth being pushed away from each end of the tiller rotor, as would take place if symmetrically sided blades were used at each end of the rotor.

Attention is now redirected in FIG. 2, wherein it is to be noted that the device in accordance with our invention is proceeding in a left-to-right direction, with of course the rollers 14 and 16 turning clockwise as they appear in this figure. However, as previously mentioned, the tiller rotor 80 preferably turns in a direction counter to the direction of motion of our device over the ground, or in other words, in counterclockwise direction, as indicated by arrows in FIG. 2. In the aforesaid practical example, a rotor fitted with three rows of blades having a face width of three inches each and sweeping a circular path of 18 inches diameter may be traversed at 5 miles per hour when the rotor is driven at 280 revolutions per minute while tilling to a depth up to 5 to 6 inches. A smaller rotor sweeping a path having a diameter of 10 inches operated at 500 rpm has much the same characteristics, except that the depth of tillage is limited to about 3 inches, which is satisfactory for under-tree tilling.

If contra rotation is not used, many more rows of blades are required or the angular velocity must be greatly increased, or perhaps both of these, in order to obtain overlapping excavations at the same traverse speed. The optimum diameter, number of rows of blades, and rotational speed are markedly different when the opposite senses of rotation of the tiller rotor are being compared.

The soil working properties are different for contrary rotation, and non-contra or proper rotation of the bladed rotor. With proper rotation a blade cuts downward from the surface of the soil along the curve of a cusp of a trochoid to an intercept with the excavation by a similar blade in the preceeding row and produces a relatively short and thick clod which is ejected to the rear, along with uprooted vegetation. However, with contrary rotation, a blade contacts the soil near the lowest point of the excavation left by the similar blade in the preceding row and cuts upward to the surface. The path of the blade tip is the long radius part of a trochoidal figure. The excavation has a relatively long and thin scimitar shape but the shape of the clod is dependent on the blade form and the soil characteristics. Since each blade enters the soil in the excavation left by its mate in the preceding row, most of the soil excavated by it is lifted and turned from below the surface. Dry, friable soil free from stones, bottles, trash, iron and the like poses no problems, but a generally useful tiller must cope with wet soil, including gumbo and clay, and hard objects. The face angle of each blade, which is half the included angle between faces when symmetrically disposed, must then be sufficiently acute so that sticky soil flows over the blade face and is turned as by a plow instead of sticking and being pushed ahead as a compacted clod. The range of angles within which the flow of sticky soil over the blade face occurs and useful work is accomplished is known as a scour angle. The inertia of the soil and the large acceleration given the turned ribbons of soil in a contra rotary tiller permit the use of more obtuse face angles as scour angles than would be the case with a turn-plow. The face angle also is directly related to the lead of the helix formed by the congruent faces of a row of blades and thus to the width of the channel between these faces and the trailing edges of the blades in the preceding row.

One important function of the present helical arrangement of the blade faces is to carry large hard objects to the end of the rotor and there discharge them. This function is best served by face angles between 30° and 55°, while a face angle of 55° is the maximum useful scour angle at extreme rotor speed, and would not induce the effective cross-mixing of a lesser angle. Within the range of 30° to 55°, the acute angles are favorable to the mulching of heavy vegetation such as saplings, large tree roots and scrub, while the less acute angles are favorable to the mulching of light vegetation. Thus a 45° face angle is preferred in a general purpose tiller, with the rotor operated at a speed for which this angle is a maximal scour angle. This choice permits of course the use of 90° angle iron for the blade supports and for the working faces CB, which is readily available in a wide range of alloys. In use, hard objects are readily carried to the end of the rotor to be ejected and the displaced soil and vegetation is projected forward and to each side but immediately attain equilibrium with a preceding roll of soil and vegetation from which smaller pieces are cut and carried over the rotor to be discharged at the rear. The shear bar 15 utilized adjacent the blade tips may be along the lines of the shear bar 17 taught in U.S. Pat. No. 3,220,486 issued to the present inventors.

A contra rotating tiller rotor causes a substantial flow of earth inside the housing 12, as is to be seen in FIG. 2, with the generally parallel array of chains 13 playing a significant role in preventing too great an accumulation of earth in the housing. The vibration and deflections of the numerous chains keep the earth moving downwardly and rearwardly.

Adequate clearance between the cover and the sweep of the rotary blades to permit the free flow of soil over the rotor is essential, except at the lower front edge of the cover. With inadequate clearance, the power requirements become excessive and the wear rate is greatly increased in abrasive soil. If sticky soil is allowed to accumulate in the top of the cover the clearance is reduced to a minimum. Under such circumstances a rotor has been so worn as to be useless in a few hours of use. Accordingly, we prefer to introduce enough slack into the chains 13 comprising the upper segment of the cover so that they will constitute a smooth transition from the fixed elements of the cover when they are arched upward as shown in FIG. 2 by the force of soil flowing beneath them.

With the use of the preferred contra rotating cutter rotor 80, there is a substantial mound of earth and cut vegetation built up in front of the rotor, just below the capture plate 50, as are to be seen in FIG. 2. We prefer to call this mound the preceding roll, which is of an almost fluid character. By the preceding roll being carried forward, it enables our machine to be particularly capable of performing a leveling function, such that low spots or furrows in a field can be automatically filled in. The capture plate 50 plays an important part in interacting with the preceding roll, for it serves to prevent the earth and the growths intercepted and cut by the blades of the rotor from being thrown upwardly over the roller 14. We prefer for the forward part of the capture plate to be maintained closely adjacent the rear edge of the roller 14, thus to prevent cut vegetation from being caught between the plate 50 and the roller. To this end, we utilize a link or stabilizer bar 23 on each side of the machine, as shown in FIG. 1 as well as FIGS. 8 and 9A. These two latter figures reveal the forward end of the link 23 to be secured between mounting members 20a welded to the underside of the cross axle 20, and the rear end of the link to be secured to adapter plate 21 by the use of a bolt 23a.

As will be obvious, the pair of links 23 maintain a desired spacing between the front of the capture plate 50 and the rear of the front roller 14, despite inclinations of the rollers with respect to the housing 12 as shown in FIGS. 3 and 4.

Although we are not to be so limited, we prefer for the capture plate to be of steel, and to have substantial thickness, such as being three-eighths inch thick, thus giving some back-up or strength to the shear bar 15, which preferably bolts to the rear side of the capture plate, as shown in FIG. 2. In this manner, any substantial deflection of the shear bar 15 during the cutting of roots and other heavy growths is effectively prevented.

The capture plate 50 thus moves upwardly or downwardly with the shear bar and other components of the housing as any depth type adjustments of the tiller rotor are made. We have found that the capture plate should have a left-to-right dimension substantially corresponding to the length of the tiller rotor, which may be ten feet, with the front-to-back dimension of the capture plate typically being 6 inches for a tiller rotor having a diameter of say 18 inches. For tiller rotors of a different diameter, we preferably utilize a capture plate of a proportionately different front-to-back dimension.

We have found that clogging is minimized by angling the capture plate in the manner shown in FIG. 2, that is, with the rear end at approximately the level of the axle of the rotor 80, and the front portion disposed somewhat lower.

Figure 8:
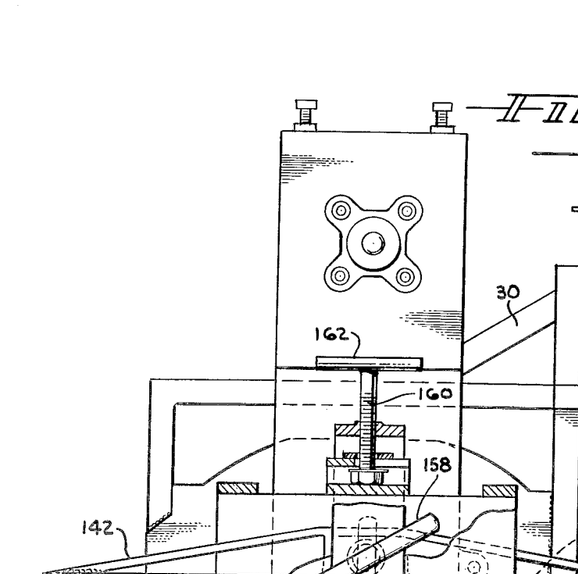
FIG. 8 is a side elevational view, partially foreshortened and sectioned so as to reveal certain aspects of the height adjustment arrangement utilized in connection with the rotor.
Figure 8A:
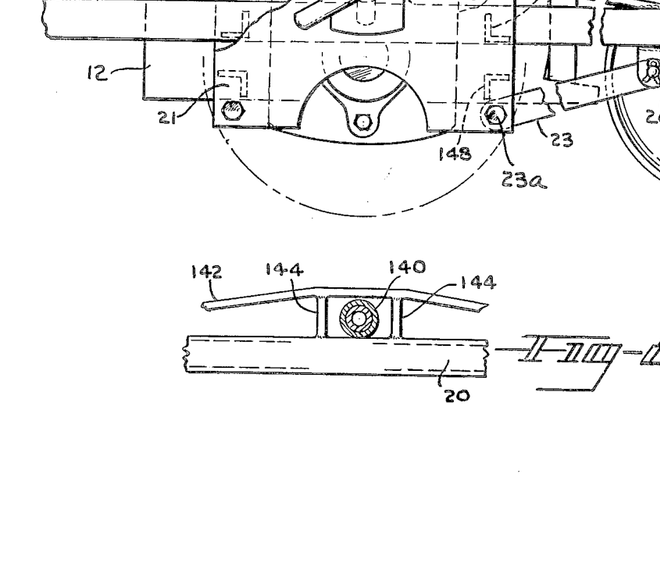
FIG. 8A is a fragmentary view relatable to FIG. 8, revealing the manner in which the weight of the rotor housing is borne by a side rail.

Turning now to FIG. 8, it will be seen that this figure is somewhat along the lines of FIG. 6, but differs in that the adapter plate 21 is illustrated, along with a portion of the cross axle 20 operatively mounted therein. As will be explained in considerable detail, the weight of housing 12 and the components carried thereby is borne at the midportion of the cross axles 20 and 18. Related FIG. 9 has been sectionalized to reveal the components utilized at this midportion, and from this latter figure, it can be seen that a roller 140 is in contact with the upper surface of the cross axle 20. See also FIG. 9A. This roller is at all times maintained in the midportion of the cross axle 20 by virtue of bridge type member 142 having vertical members 144 that together define a location in which the roller 140 is essentially captive; note FIG. 8A. Since the construction at the opposite end of housing 12 is identical, the significant details at only one end of the housing need be explained.

Figures 9, 9A:
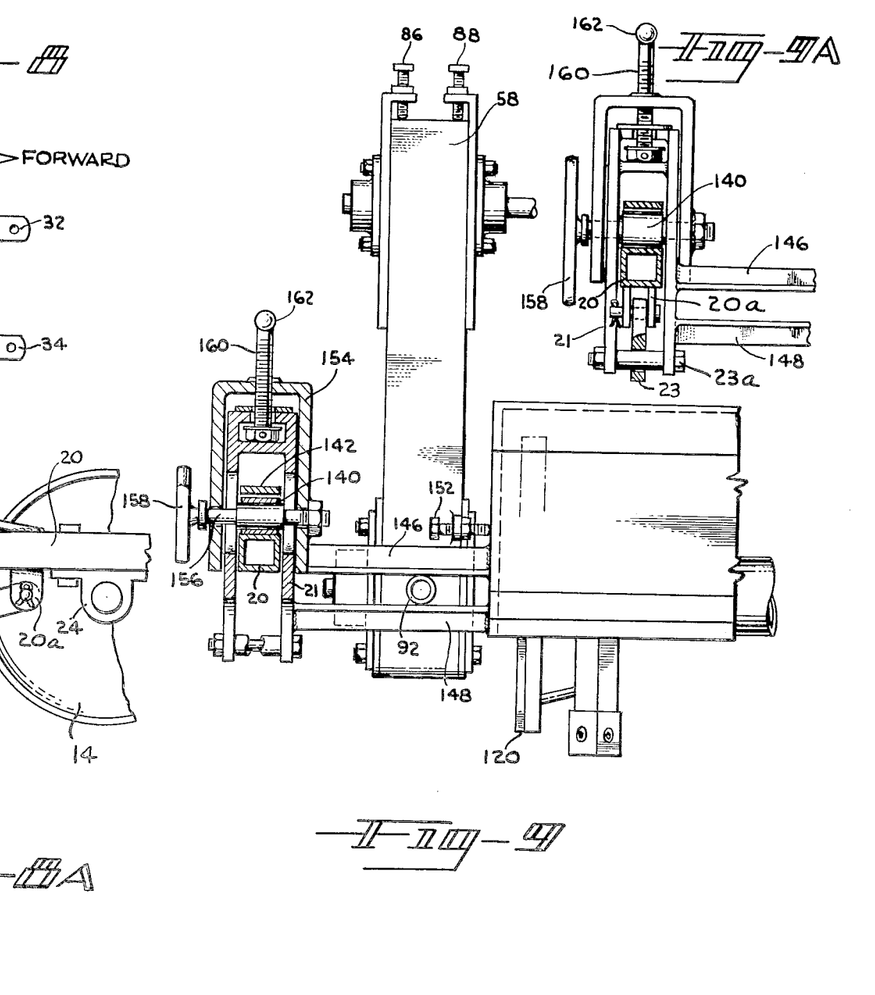
FIG. 9 is a view taken 90° to FIG. 8, and partially sectioned to reveal significant rotor height adjustment means.
FIG. 9A is a fragmentary view closely relatable to FIG. 9, and revealing the roller utilized in each adapter plate, as well as the stabilizer link utilized with each adapter plate.

FIG. 9 reveals the stub shaft 92 mentioned in conjunction with FIG. 6, with the member 92 being disposed between spaced horizontal members 146 and 148 extending outwardly from the housing 12, which members are bolted to square tubing visible in FIG. 6, that is secured to the adapter plate 21. As will be noted, the adapter plate 21 has a significant thickness dimension such that the cross-axle 20 can be accommodated between the left and right sides of the adapter plate. Bolts 152 shown in FIG. 9 are used to centrally locate tiller rotor 80 inside housing 12.

FIG. 9 reveals the components utilized in conjunction with the adapter plate 21 and the cross axle 20 in order that the depth of cut of the tiller rotor 80 can be adjusted. It will be recalled that the large rollers 14 and 16 form the principal support for the housing, with the cross axles 18 and 20 being able to tilt in their respective adapter plates relative to the housing 12. This motion of course takes place about the roller 140 and its counterpart in adapter plate 19, and in both instances, this can be considered as representing the location at which the weight of the housing is put upon the two cross axles. The horizontal member 146 and 148 establish a fixed relationship between the housing 12 and the adapter plates 21, which of course means that if the location where the cross axle resides in the adapter plate can be changed in the vertical sense, the depth of cut of the tiller rotor can be changed accordingly. To this end, we provide a yoke member 154 of steel strap that essentially surrounds the upper portion of the adapter plate 21. Various figures of drawing show the yoke 154 to have an essentially U-shaped cross section, with a large horizontally disposed bolt 156 threadedly engaging the inner portion of the yoke. It is upon this bolt that the roller 140 is disposed, which of course means that the weight of the end of the housing 12 depicted in FIG. 9 may be regarded as being concentrated at the location of the roller 140 on the cross bar 20, with the inner and outer ends of the bolt 156 in turn transferring the support afforded by the cross axle 20 to the yoke member 154. A height adjustment screw 160 threadedly engages the upper portion of the yoke, but the lower portion of screw 160 is rotatably disposed in the upper portion of the adapter plate 21, which of course means that rotation of the height adjustment screw 160 by means of the handle 162 mounted at the upper portion thereof makes it possible for the height relationship between the yoke and the adapter plate to be selectively modified in a straightforward manner. Appropriate slots are provided in the adapter plate at the location of the bolt 156, so that height changes can freely take place between the yoke and the adapter plate.

As should now be apparent, as the handle 162 is turned clockwise as viewed from a location above FIGS. 8 and 9, this causes the upper central portion of the yoke member to move away from the upper portion of the adapter plate, which of course means that the bolt 156 moves up, thus permitting the cross axle 20 to move upwardly in the adapter plate. Inasmuch as it has already been pointed out that the cross axle 20 may be regarded as supporting the end of housing 12 visible in FIGS. 8 and 9, as the cross axle seemingly moves up in the adapter plate, this in reality means that the adapter plate is moving downwardly, and this in turn means that the lateral bars 146 and 148 as well as the housing 12 supported thereby are allowed to lower with respect to the rollers 14 and 16, which of course means that the tiller rotor 80 is thus permitted to take a cut of increased depth. Rotation of the handle 162 in the opposite direction of course enables the rotor 80 to make a shallower cut.

The bolt 156 is provided with a handle 158, which enables this bolt to be tightened, thus to prevent undesired vertical movement of the roller 140. Bolt 156 is loosened only when it is desired to rotate screw 160 to effect a height change.

Although a preferred embodiment of our tiller rotor involves the one-piece construction as just described, with teeth or blades extending the entire lateral width of the rotor, we could use an arrangement in which the central portion of the machine does not accomplish any tilling, where stubble is to be allowed to grow back in selected locations. Thus, by using left and right rotors, with the central portion left open, or using a rotor 80 having no teeth in its mid-portion, our machine could straddle one or two selected rows of a field, and then proceed to mulch on either side thereof, with this procedure being repeated as many times as necessary in order to leave untilled the desired number of rows in the field.

It should be noted that the rearward roller 16 serves additional functions beyond support. By compacting the surface of the soil it reduces wind erosion and hastens the reduction of buried vegetation to humus and the germination of seeds. Also, it provides a flat surface favorable to the planting of salad vegetables and to the mechanical harvesting of fruit chemically parted from trees.

Any soil tending to build up on the rear roller 16 is removed by the scraping action of bar 17, which is mounted on the cross-axles 18 and 20 in such a manner as to be able to float up or down to whatever extent necessary during operation of our device.

We claim:

1. In a tiller having a bladed rotor driven in the opposite rotative direction to that of supporting wheels, the improvement comprising said bladed rotor having at least one helical row of radially-disposed blades, each of a majority of said blades having a pair of essentially radially disposed working faces thereon, the working faces of each pair residing in different planes, and together forming a vertex, each pair of working faces being disposed at essentially equal angles to a plane passing through the vertex orthogonal to the axis of said bladed rotor, said bladed rotor being disposed in a fixed cooperative cover embracing approximately the upper half of the sweep of said bladed rotor, said cover having a gap therein disposed essentially parallel to and spaced above the axial center of said bladed rotor, and a plurality of essentially parallel lengths of chain attached to said cover so as to span the gap, the motion of said chains, taking place during the operation of said tiller, preventing the buildup of earth on the underside of said cover.

2. In a rotary tiller having a bladed rotor driven in the opposite rotative direction to the direction of rotation of supporting wheels, the improvement comprising a helical row of blades on said bladed rotor wherein each of a majority of said blades carries first and second substantially radial working faces inclined at opposite and substantially equal maximal scour angle to the figure of revolution of the vertex of said working faces, said tiller further comprising a fixed co-operative cover supported above said bladed rotor, said cover comprising front and back portions and mid portion comprising a plurality of chains secured between said front and back portions and overlying a portion of said rotor with said chains being spaced from said rotors, the mid portions of said chains being free to vibrate and deflect, and thus prevent a substantial accumulation of earth in said housing.

3. The invention according to claim 2, wherein the said first substantially radial working faces define a helix concentric with the said bladed rotor and having a lead angle substantially equal to the said maximal scour angle.

4. The invention according to claim 3, further comprising structural elements connected to said working faces and bridging the gaps between said blades in said helical row, said structural elements being placed to cooperate with said first substantially radial working faces in defining said helix.

5. The invention according to claim 2, wherein the said fixed cooperative cover embraces approximately the upper half of the sweep of the said bladed rotor and is divided into three principal segments along lines parallel to the axis of the said bladed rotor, said cover generally having a working clearance from the sweep of the said bladed rotor equal at least to the effective length of the said first and second substantially radial working faces of the said blades.

6. The invention according to claim 5 wherein the forwardmost of said segments includes a lower lip, said lower lip comprising a capture plate extending forwardly of the said sweep of the said bladed rotor a distance at least equal to half the effective height of said capture plate above the soil during active tillage.

7. The invention according to claim 6, wherein the rearward edge of the said capture plate comprises a shear bar adjacent the said sweep of the said bladed rotor.

8. The invention according to claim 5 wherein the rearward of the said segments comprises a substantially vertical discharge portion extending downward substantially to the height of the said axis of the said bladed rotor.

9. The invention according to claim 5 wherein a gap exists between said forward and rearward segments, and the central of said segments comprises parallel lengths of chain attached to, and spanning the gap between, upper lips of said forward and rearward segments.

10. The invention according to claim 9 wherein the said lengths of chain have each a length exceeding the width of said gap by an amount such that they form an arcuate sector approximately concentric with the said sweep of the said bladed rotor when raised by soil thrown against them during active tillage.

11. The invention according to claim 6 further comprising a forward roller closely preceding said capture plate.

12. The invention according to claim 8 further comprising a rearward roller following the said vertical discharge portion.

13. A rotary tiller comprising rotative supporting means, a bladed rotor, said bladed rotor being driven in the opposite rotative direction to that of said rotative supporting means, a fixed cooperative cover mounted above said rotor and embracing substantially the upper half of the sweep of said bladed rotor, said cover comprising separated rigid forward and rearward segments, and a flexible upper segment comprising parallel lengths of chain attached to upper lips of said forward and rearward segments and spanning the separation therebetween.

14. The invention according to claim 13 wherein said lengths of chain have each a length exceeding the width of said separation by an amount such that each of said chains form an arcuate sector smoothly extensive of said rigid forward and rearward segments when raised by soil thrown against them during active tillage.

15. The invention according to claim 13 wherein the lower lip of the said rigid forward segment comprises a shear bar adjacent the sweep of the said bladed rotor, and a forwardly-extending capture plate.

16. The invention according to claim 15 wherein the lower portion of the said rearward segment comprises a substantially vertical discharge portion extending downward substantially to the height of the axis of the said bladed rotor.

17. The invention according to claim 15 further comprising a pivotal support adjacent each end of said bladed rotor, a forward roller closely adjacent said capture plate, a rearward roller adjacent said vertical discharge portion, and rails orthogonal to the axes of said bladed rotor and said forward and rearward rollers, each roll further comprising a bearing surface for a like end of each of said forward and rearward rollers and said pivotal support.

18. The invention according to claim 17 further comprising linkage between a first bearing structure on each rail closely related to the said bearing surface for said forward roller, and a second bearing structure on said pivotal support related to the projection of the forward edge of the said capture plate.

19. The invention according to claim 17 further comprising means for adjustment of the height of said rotor axis of said bladed rotor above a surface beneath said forward and rearward rollers.

20. The invention according to claim 19 wherein the said means comprises means for moving and securing the pivot within said pviotal support.

* * * * *